Oct. 13, 1931.   H. P. BURT ET AL   1,826,987
METHOD OF PRODUCING OLIVE OIL
Filed Sept. 13, 1926
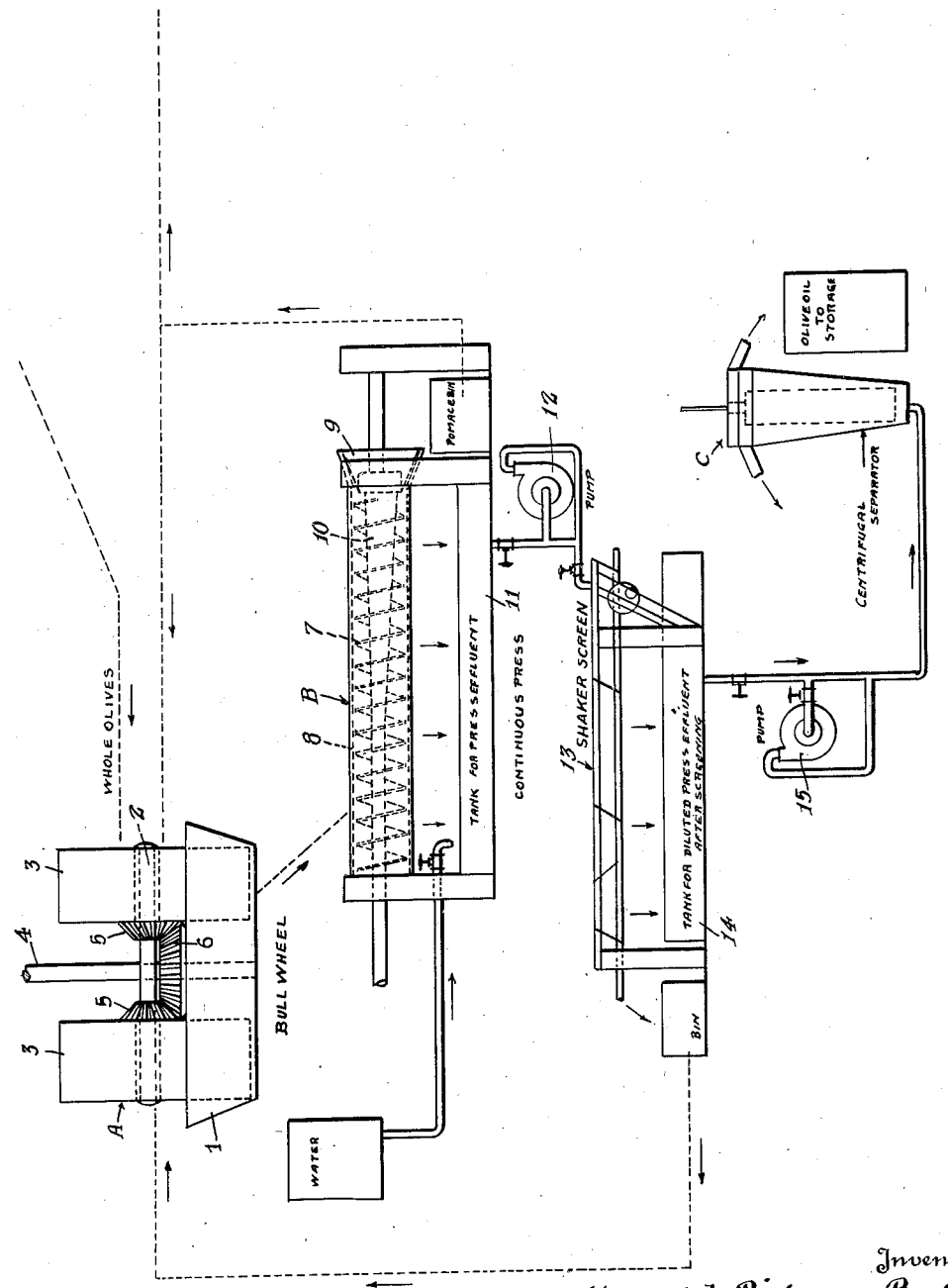

UNITED STATES PATENT OFFICE

HOWARD PIERSON BURT AND GRINNELL BURT, OF PALERMO, AND RALPH E. SANBORN, OF SAN FRANCISCO, CALIFORNIA, ASSIGNORS TO CALIFORNIA PACKING CORPORATION, OF SAN FRANCISCO, CALIFORNIA, A CORPORATION OF NEW YORK

METHOD OF PRODUCING OLIVE OIL

Application filed September 13, 1926. Serial No. 135,110.

This invention relates to a method of extracting oil from oleaginous substances, and is particularly useful for the production of olive oil.

It has been the standard practice to run olives through a crusher, express the liquid from the crushed material in a hydraulic press, and then settle and decant the liquid. This method has required the crushed material to be subjected to several successive pressings, and each such successive pressing produces an oil of lower grade.

The object of the present invention is to provide a method for extracting olive oil that will increase the yield and improve the quality of the oil extracted and decrease the time and labor required for the operation.

Our invention contemplates crushing and pressing the fruit in such a manner that a mixture of the oil, juice and pulpy matter is obtained, separated from the non-oil-bearing residue (substantially consisting of pits and skins), the mixture being produced in such condition that it can be substantially completely separated by centrifugal action into free oil, non-oil-bearing liquid and solid constitutents.

It is known that some extraction of olive oil may be obtained by merely rupturing the oil-containing cells of the olive, and separating the comminuted mixture of solid matter and liquid by centrifugal action. Protracted experiments have shown that unless the olives be in a condition particularly adapted and suited for the purpose, a satisfactory yield of recovered oil cannot ordinarily be procured by this simple method. We have found that to increase the yield of recovered oil and adapt the process to the customary run of fruit, it is necessary to press the broken fruit to facilitate the escape or drainage of the oil from the ruptured cells. This permits the centrifugal separator to then act effectively upon the intermingled solid matter and liquid to provide a maximum recovery of oil.

To secure the full benefits of our discovery, we have found it necessary to adopt certain features of manipulation which can best be understood from the following illustrative description of an operation embodying our invention, reference being made to the accompanying drawing in which we have shown an arrangement of apparatus found to be well adapted to our purposes.

Pursuant to our invention, the clean washed fruit is first crushed, preferably by means of an ordinary "bull-wheel" or "edge-runner" A. This device consists of a large circular steel pan 1, within the outer part of the surface of which revolve (on horizontal axes or shafts 2) one or more heavy cylindrical wheels 3, the wide peripheral faces of which are set close to the pan 1. The horizontal shafts 2 on which the wheels 3 revolve are supported and propelled by a vertical shaft 4, the axis of which coincides with the center of the pan 1, and the horizontal shafts 2 are so adjusted on the central shaft 4 that there is a clearance between the pan and the faces of the wheels 3. We find that a clearance varying from one-quarter inch to three-eighths inch produces the most satisfactory results, depending upon the size of the olives to be crushed, their maturity, variety, condition, size of pits, and the like. The wheels 3 are provided with bevel-gears 5 on their inner vertical surfaces, which mesh with a large central bevel-gear 6 which turns the crushing wheels at a speed slightly in excess of the speed at which they would turn if the wheels were allowed to run free on their axes and were propelled only by the friction of the material being crushed. The outer portions of the crushing surfaces of the wheels 3 move in a larger circle than that of the inner portions of the crushing surfaces, giving the effect of laterally twisting the material in addition to the crushing effect introduced by the weight of the wheels themselves.

We obtain a number of advantages by first crushing the clean fruit in the manner indicated. A maximum of the oil-bearing cells of the fruit are ruptured, with a minimum emulsification of the oil with the water in the olive. The olives are crushed to a consistency which allows a maximum escape or drainage of the liquid from the ruptured cells during the subsequent pressing of the crushed material. The olives are crushed to a consistency which allows a maximum filtration of the oil-bearing liquid when the crushed material is passed through the press. The olives are crushed to a consistency which mechanically allows the press to exert an effective pressure on the material and enables the press to so act on the crushed material that the centrifugal separator to which the press effluent is passed can recover a maximum yield of oil. The olives are reduced to a condition that allows the press to further break down a maximum number of the oil-bearing cells that are not ruptured by the crusher. A minimum number of fruit pits are broken and any danger of subsequent impairment of the quality of the recovered oil or delay in pressing is avoided. We have found that the relatively coarse crushing in the bull-wheel A, employing a clearance varying from one-quarter inch to three-eighths inch as stated, produces better results than either a finer or coarser grinding. We attribute this result to two factors, (1) the coarse ground material enables the press to which the material is subsequently fed to obtain a sufficient "bite" on the ground material to build up a relatively high pressure, and (2) the material is not so finely ground that the oil-bearing solids pass out of the press before they have a chance to be acted upon thoroughly by pressure to facilitate the drainage or separation of the oil and before the oil has been caused to filter through the solid material.

We next press the crushed fruit, and for this purpose we prefer to employ a continuous screw-press B of well known construction. The crushed material may be fed to the press in the condition it is received from the crusher A or may be mixed with water or pomace, as hereinafter stated. The press consists of a longitudinal worm or helix 7 surrounded (except at the feed-hopper) by a cylindrical screen 8. The screen 8 forms a member provided with restricted orifices or perforations. At the discharge end of the press is an adjustable cone 9. The pressure built up in the press A may be controlled by regulating the cone 9 or by the pitch of the worm employed. The hub 10 of the worm 7 gradually increases in size, reaching its largest diameter at the discharge end of the press. The slowly revolving worm 7 (approximately 6 R. P. M.) carries the material into the cylindrical screen 8. The gradual enlargement of the diameter of the hub of the worm 7, and the pressure of the material against the cone 9 at the discharge end of the press, builds up a pressure upon the crushed material passing through the press. The final yield of oil extracted by our process is found to depend somewhat upon a proper balance of pressure and drainage in the press B. We have obtained relatively good yields with considerable variations in the regulation of the cone, the worm pitch, and in the size of the restricted perforations or screen openings. The perforations in the screen 8 are preferably within a range of approximately 1/2500ths to 1/1600ths of a square inch. The pressure built up upon the crushed material in the press B acts to force the oil-bearing material through the restricted perforations of the screen 8.

The forcing of the oil-bearing material under pressure through the press B and out the restricted perforations of the screen 8 serves several useful purposes. Before the material is discharged from the press, the relatively high pressure to which the material is subjected tends to cause the oil to escape or drain from the ruptured oil-cells, and the forcing of the oil-bearing material through the restricted perforations of the screen 8 tends to rupture additional oil-cells. Before the material reaches the screen 8, the passage of the liquid under pressure through the crushed material produces a desirable filtration of the oil-bearing liquid. This filtration reduces the amount of emulsification of oil and water in the oil-bearing liquid. This produces a condition of the oil-bearing liquid which facilitates the separation of the oil by centrifugal force.

The effluent from the screen 8 comprises oil-bearing liquid and finely divided or comminuted solid matter. Not only have the oil-bearing cells of the fruit been ruptured to release the oil, but the subjecting of the crushed mass over a period of time to high pressure facilitates the escape or drainage of the oil from the cells to permit a ready centrifugal separation. Because of this drainage obtained by subjecting the crushed material to pressure, we are able to readily centrifugally separate the oil, and recover a high yield of oil from fruit from which oil can not successfully be recovered by merely rupturing the oil-bearing cells and centrifuging the ruptured material. The residual substantially non-oil-bearing solids (constituting the pomace) are discharged at the cone 9.

The press-effluent from the perforations in the screen 8 is thick and heavy, consisting of oil and water in a semi-emulsified condition intermingled with finely divided particles of semi-colloidal solid matter. We prefer to add approximately eight to ten parts of water to each part of this press-effluent to allow the liquid to be handled by pumps, and to give the liquid a dilution that may be effectively handled by a centrifugal separator. The water may be added to the press-effluent in a tank 11, and the diluted effluent pumped by a pump 12 to a shaker-screen 13. This screen picks out any large particles of pits, skin and pulp that have been imperfectly prepared for centrifugal separation, and these particles may be returned to the bull-wheel A for re-crushing. We find that these particles constitute approximately one to five per cent of the solids in the effluent. The shaker screen 13 further serves to break up and distribute the conglomerate masses of fine pulp uniformly throughout the liquid, rendering them more susceptible to effective centrifugal separation. The screening out of the larger solids reduces the frequency with which the centrifugal separator must be cleaned.

After the press-effluent is diluted and screened, it is passed to a tank 14 in which it may be stirred by a suitable revolving paddle (not shown), thereby maintaining the uniformity of the effluent by preventing a conglomeration of the suspended solids and preventing the settling of any other part of the semi-emulsified fluid that has a specific gravity different from that of the other parts of the fluid. The diluted press-effluent is then passed preferably by a pump 15 to a centrifugal separator C. This centrifugal separator is of the usual type, in which the diluted effluent is fed into a rapidly revolving separator bowl, the water being discharged from a set of openings near the outside of the bowl, and the oil being discharged from a set of openings nearer the center of the bowl. Part of the solids are carried out with the water, relatively little comes out with the oil, and the balance gradually accumulates in the bowl, depending upon the relative specific gravity of the solid matter. Fine particles of pits, for instance, are heavier than water and accordingly remain in the bowl. It is necessary to stop the bowls and clean them at suitable intervals.

In centrifugally separating oil from liquids in which pulp or other solids are present, it has been customary in the past to introduce a separate stream of water into the bowls, in addition to the oil-bearing liquid. This has been done to wash out a maximum of the solids into the waste-water discharge. We have found that the introduction of the separate stream of water upsets the uniformity of the gravities of the constituents of the oil-bearing liquid, there being no chance for the water to mix uniformly with the oil-bearing liquid. By properly diluting the press-effluent, and feeding to the centrifuge only the oil-bearing liquid, in the manner indicated, we obtain a more efficient separation and a higher yield of oil.

The oil recovered at the centrifuge separator by our process is found to be a relatively high percentage of the total oil content of the whole fruit. Under practical operating conditions, we are able to recover from sixty to ninety per cent of the total oil content of the olives. This is a marked increase in yield or recovery as compared with any prior method. The oil recovered by our process is also of improved quality.

Our process may be operated continuously and greatly reduces the time required for handling the material. Once the surface of the olive is broken, decay and mold commence, and the quality of the recovered oil is directly affected by the time required for the separation. We are able to get results by our new process that we have never been able before to get by any of the former or standard methods employed for the recovery of olive oil.

We find that only a relatively small part of the oil contained in the fruit remains in the pomace discharged at the end of the press B. Varying amounts of this pomace may be added to the whole fruit going to the crusher A to permit an additional recovery or oil remaining in the pomace. The intermingling of this pomace with the whole fruit may serve the further purpose of regulating and maintaining a uniform consistency of the material being fed to the press B, thus keeping the press operating at its maximum efficiency. The amount of pomace to be added depends upon the condition of the olives, e. g., whether they are ripe, green, shriveled, plump, frosted, large, small, etc. Enough pomace is added to maintain the proper relation of oil, water, pulp and pits in the mass to be pressed, to obtain the best results, for example when ripe or mushy olives are being treated it may be more desirable to introduce pomace than when shriveled olives are being treated. We have also found it advantageous with some types of olives to introduce a small amount of water into the crusher A as the fruit is being crushed, or into the feed hopper of the press B. The addition of water facilitates the press feed and is particularly helpful to an inexperienced operator in serving somewhat as a substitute for proper grinding and proper press operation. These variable factors may be solved by preliminary runs. Solids separated at the shaker screen 13 may also be added to the mixture fed to the crusher A in proper proportion and for the same purpose. Under certain conditions, the centrifugal separation may be conducted in stages to provide a successive separation of the various constituents of the diluted press-effluent, and certain of the constituents may be re-run to obtain further yields.

We desire to point out that the method of extracting olive oil provided by our invention differs radically in principle and performance from the hydraulic press method heretofore customarily employed. The hydraulic press method involves several cycles of operation, each cycle consisting of crushing the fruit, building cheeses of the crushed material, expressing oil from the cheeses in a hydraulic press, settling and decanting the oil, and returning the cheeses or pomace to the press for the succeeding cycle. Our method recovers the oil in one more simple and much more rapid cycle. By the hydraulic press method, a portion of the oil and juice is expressed from the cheese by each cycle substantially free from fiber or pulp, whereas by our method the fruit is broken up by a combination of grinding and pressing in the manner indicated, so that the oil, juice and substantially all of the pulpy matter of the fruit are obtained together, separated from the non-oil-bearing constituents of the fruit, the resulting condition of the oil-bearing mixture being such that it can be substantially completely separated into free oil and non-oil-bearing liquid and solid matter by centrifugal action.

The press employed in our method does not function to express the oil and juice substantially free from fiber or pulp as does the hydraulic press, but functions to free the oil and juice from the fruit cells to produce a mixture of finely divided solid matter suspended in the liquid and from which the non-oil-bearing solid matter has been separated. With the hydraulic press method, the separation of oil and fruit juice can be made by a simple gravity separation, whereas with our method only about 2% or 3% of the oil can be recovered by simply allowing the mixture to stand, the constituents settling or separating according to their specific gravities, and separation by centrifugal action is required.

When oil is extracted by a series of cycles of operation, as with the hydraulic press method, the first cycle yields the best oil and the oil becomes progressively worse as the cycles are repeated. This is primarily because deterioration ensues as soon as the fruit is first ruptured and proceeds as long as the extraction is in progress. Not only do we obtain a higher total yield of oil by our method than can be obtained by hydraulic press method, but all the oil recovered by our process is of virgin quality, whereas only 30% to 40% of the oil recovered by the hydraulic press method is of virgin quality. This improvement of quality achieved by our process is due primarily to the fact that by our process the oil may be recovered free from the other constituents of the fruit in less than an hour from the time the skin of the olive is first broken as compared with an elapsed time of 24 to 36 hours that ensues in the hydraulic method between the time when the skin of the olive is first broken and the major portion of the oil is separated from the flesh of the fruit.

While we have stated that we prefer to employ a crusher A and a press B to accomplish successively crushing and pressing the fruit, required in carrying out our invention, there is no reason why the crushing and pressing cannot be performed simultaneously in a single device within the contemplation of our invention.

Our invention is not limited to the details of the operations described here for the purpose of illustration, nor is our invention limited to the employment of the particular apparatus herein described, but is of the full scope of the following claims.

We claim:

1. A method of producing olive oil which comprises crushing olives, applying pressure to the crushed material to force a mixture of oil-bearing liquid and finely divided solid matter through restricted orifices and to separate therefrom the non-oil-bearing constituents of the fruit, diluting the mixture forced through the orifices, and centrifuging the diluted mixture to separate the oil therefrom.

2. A method of producing olive oil which comprises crushing olives, applying pressure to the crushed material to force a mixture of oil-bearing liquid and finely divided solid matter through restricted orifices and to separate the major portion of the non-oil-bearing constituents of the fruit from the mixture of oil-bearing liquid and finely divided matter, diluting the mixture forced through the orifices, screening the diluted material, agitating the screened material, and centrifuging the diluted and screened material to separate the oil therefrom.

3. A continuous method of producing olive oil comprising crushing olives, applying pressure to the crushed olives in a screw press to drain oil bearing liquid out of the cells and to force the oil bearing liquid and some finely divided solid matter through restricted openings and to separate therefrom the non-oil-bearing constituents of the olives, diluting the mixture forced through said openings and centrifuging the diluted mixture to separate oil therefrom.

4. A process as in claim 1 and in which non-oil-bearing solid constituents produced in performance of the method are added to olives during the preliminary crushing.

5. A continuous method of producing olive oil, comprising preliminarily crushing olives, applying a gradually increasing pressure to the crushed olives in a screw press to force a mixture of oil-bearing liquid and finely divided solid matter through restricted orifices, and to separate the major portion of non-oil-bearing constituents of the olives from said mixture, diluting the mixture forced through the orifices, and centrifuging the diluted mixture to separate the oil therefrom.

6. A continuous method of producing olive oil, comprising preliminarily crushing olives, applying a gradually increasing pressure to the crushed olives in a screw press to force a mixture of oil-bearing liquid and finely divided solid matter through restricted orifices and to separate the major portion of non-oil-bearing constituents of the olives from said mixture, diluting the mixture forced through the orifices, screening the diluted mixture and then centrifuging the diluted and screened material to separate oil therefrom.

7. The method of producting olive oil which comprises subjecting olives to a relatively coarse crushing, forcing the mass of crushed olives under high pressure against walls having restricted openings therein, whereby the mass is separated into a solid portion of substantially non-oil-bearing solids and an oil-bearing liquid mixture containing suspended solids, diluting said liquid mixture with water to render it free flowing, and centrifuging the diluted mixture to separate the oil from the other constituents thereof.

8. A method as in claim 7, in which the solid portion of substantially non-oil-bearing solids is added to olives during the relatively coarse crushing.

Signed at Palermo, California, this 2d day of September, 1926.

HOWARD PIERSON BURT.
  GRINNELL BURT.

Signed at San Francisco, California, this 31st day of August, 1926.

RALPH E. SANBORN.